Feb. 19, 1963  A. J. COAKLEY  3,077,815
OPTICAL PROJECTION CONTOUR INSPECTION SYSTEM
Filed July 5, 1955  2 Sheets-Sheet 1
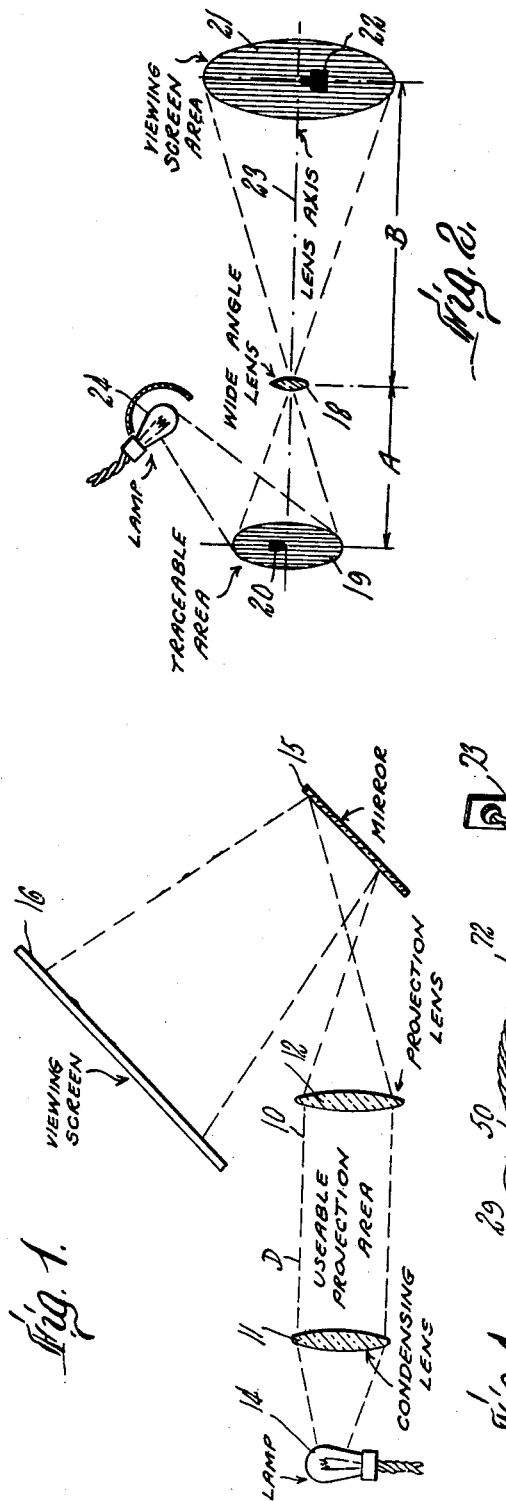
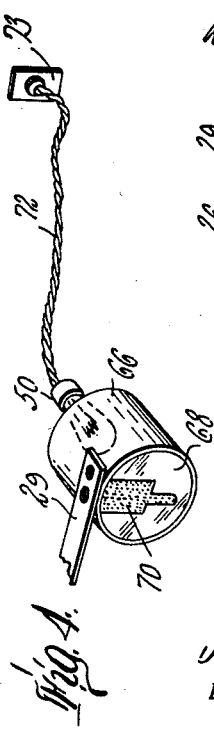
INVENTOR.
Arthur J. Coakley
BY

United States Patent Office 3,077,815
Patented Feb. 19, 1963

3,077,815
OPTICAL PROJECTION CONTOUR
INSPECTION SYSTEM
Arthur J. Coakley, Springfield, Vt., assignor to Jones and
Lamson Machine Company, a corporation of Vermont
Filed July 5, 1955, Ser. No. 519,820
5 Claims. (Cl. 88—24)

The present invention relates to optical projection inspection systems for use in industry to determine the conformity of manufactured parts to predetermined standards. More paritcularly the present invention relates to optical projection inspection systems of the type adapted for inspecting contoured and recessed surfaces in manufactured parts or devices that cannot be projected directly.

As is well known, to meet the problem of inspecting a contoured surface which cannot be projected directly, such as a recessed die for example, for accuracy of shape, the surface inaccessible to parallel light is explored with a hard tipped main or tracing stylus that is moved along with the surface to be inspected and is rigidly connected to move jointly with the similar follower or projection stylus in spaced relation thereto in a one-to-one ratio as a unit. The remote or follower stylus has the same size tip and is placed in a beam of light through which it moves as it partakes exactly of the movement of the first stylus.

The usual commercial optical comparison device or optical comparator uses a parallel beam of light which is directed upon the part to be inspected or measured. A projection lens in spaced coaxial relation to a condensing lens at the light source, and an optically flat mirror, throw a magnified image or shadow of the part in the beam upon a translucent receiving or viewing screen, where it can be inspected and measured by comparison with a master chart or outline on the screen. If the part is to pass inspection, the outline of the magnified shadow and the master chart outline will coincide. In the case of the moving follower stylus, the tip of the projected shadow moves along a master outline of the contoured surface to be inspected, generally on a magnified scale, so that inaccuracies in the surface will readily be seen.

With a double stylus arrangement of the type referred to, gravity or spring loading is provided to bias the tracing stylus into engagement with the contoured and recessed surface to be inspected. The two styli in spaced relation are mounted on a bar or like rigid linkage which is arranged to move vertically and horizontally in suitable guide bearings so that as the tracing stylus moves across the work piece in a given direction, the connecting linkage and styli will move in accordance with the contour. Thus the follower stylus will move in the light beam, taking the same path as the contour-following tracing stylus.

On the viewing screen, an operator sees an enlarged profile shadow of the follower stylus crossing the screen in direct relation to an enlarged picture or outline of the contour to be measured or inspected. This is generally represented by black line indicia applied to the surface of the screen as an enlargement of the contour of the surface to be inspected.

In the well known optical comparator devices now used for inspection and measurement of duplicate manufactured parts in industry, a high intensity projection lamp is placed behind a suitable condensing lens which converts the light from the lamp into a collimated beam of parallel light. This is a cylinder of light having a predetermined diameter which is a function of the size of the condensing lens. A receiving or projection lens is aligned with this cylinder of light. Thus the capacity of any optical comparator device is determined by the size of this cylinder of light which in turn is dependent upon the size of the lens that may be provided. The screen upon which the image is projected must be large enough to present an image of given magnification of the part to be inspected, and the limitations of the size of the screen and the size of the light cylinder or lens aperture are interdependent in determining the capacity of the optical comparator device and the degree of magnification obtainable.

For example, with a 14" diameter screen and a 10 power projection lens, a lens opening or viewing capacity of 1.4" is the maximum that can be attained since 1.4"×10=14". Therefore in the example given, the travel of the follower or projection stylus in such a system would be limited to 1.4" with a 10 power lens since the entire 14" screen would be traversed by the stylus image in its movement through a distance of 1.4" in the collimated light beam from the lens. At higher magnifications the excursion or range of movement of the inspection stylus and of the projection stylus is further restricted, whereas with lower magnifications it may be increased. For example, with a 6" diameter lens system, a 6" range of movement could be afforded the projection stylus in the collimated beam of light, and the projected image would then traverse a 30" screen with, however, a low magnification of 5 power.

Such a lens and such a screen are presently considered relatively large and at the same time they are relatively costly. A suitable 6" projection lens presently costs several thousand dollars and permits an inspection or stylus movement of only 6" and with relatively low magnification as above noted, although a relatively large screen or chart is used. For larger lens systems to meet the demand for tracing or inspecting larger industrial parts, the cost heretofore has been considered to be relatively prohibitive. However, in such industries as the aircraft industry, the tracing or contour inspection of larger and larger parts for accuracy of shape is becoming a necessity.

Therefore, it is an object of this invention to provide an improved optical projection contour inspection system which overcomes the limitations of known optical comparison devices of this type and permits a relatively wide range of operation for inspecting and measuring relatively large manufactured parts and the surfaces thereof by a tracing stylus operation.

It is also an object of this invention to provide an optical projection inspection device that operates with tracing movement of a stylus element in contact with the work to be inspected, that permits a relatively wide range of tracing movement and a relatively wide range of movement for the projected stylus image.

It is a further object of this invention to provide an improved optical projection inspection or comparison device which entirely obviates prior limitations by way of size of light source, aperture of light lens and the size of the projection or image screen.

It is also an object of this invention to provide an improved optical projection comparison or inspection system of the type having a pair of spaced jointly movable styli which obviates the projection limitations and the tracing limitations of known systems of that type and which is adapted to permit the follower stylus to be the light source per se, thereby to combine the light source and the tracing stylus in one unit for more effective image projection, greater accuracy of measurement or inspection, particularly for recessed contoured surfaces and the like, and lower cost of manufacture.

As hereinbefore indicated, the use of optical projection inspection or comparator systems developed initially for the direct projection of machine part profiles, places a restriction on the tracing movement to that of the diameter of the collimated light cylinder or beam. This restriction has heretofore been accepted generally, because of the relatively high cost of extending the range by increasing the lens field beyond the limits referred to.

In accordance with the invention, however, a wide angle projection or viewing lens such as a wide angle camera lens is provided between a traceable plane in which the follower stylus moves and the viewing screen area. By moving the follower stylus in the field of view of the lens, which is far larger than its own diameter and directly proportional to its distance from the center of the lens, the movement of the stylus may faithfully be reproduced on a screen with any desired magnification if placed a similar or greater distance from the center of the lens on the opposite side from the traceable area in which the stylus moves.

Thus, in accordance with the invention, instead of a field of collimated light, the light source itself or a stylus element illuminated by the light source is moved in the greatly enlarged field of view of a projection or viewing lens at any desired distance from the lens, and the image of the tracing element or stylus may be projected onto any suitable viewing screen of any desired size, or onto a wall surface. The magnification attained is a function of the relative distances of the stylus and of the screen from the center of the lens. If desired, the projected image or light may be folded back with a mirror to present the image on the screen as in a conventional optical comparator system.

With this system, a small relatively low cost wide angle camera type lens may be used in a dual stylus system to trace relatively large surfaces of manufactured parts and the image of the light may be passed across a screen of relatively large size or diameter. For example, with a wide angle or projection lens costing a few hundred dollars, a 12" die surface may be traced and the image of the light or stylus may be passed across a screen which permits highly effective magnification, such as a frosted glass screen 60" in diameter.

The invention will however, be better understood from the following description of certain embodiments thereof, when read in connection with the accompanying drawings, and its scope is pointed out in the appended claims.

In the drawings,

FIGURE 1 is a diagrammatic representation of an optical projection inspection or comparison system of the prior art presently used for contour and like inspection;

FIGURE 2 is a diagrammatic representation of an optical projection measuring or comparison system embodying the invention;

FIGURE 3 is a view, in perspective, of an optical projection contour inspection apparatus embodying the invention and illustrating its operation;

FIGURE 4 is a view, in perspective, of a modification of a portion of the apparatus shown in FIGURE 3, in accordance with the invention.

Figure 5:
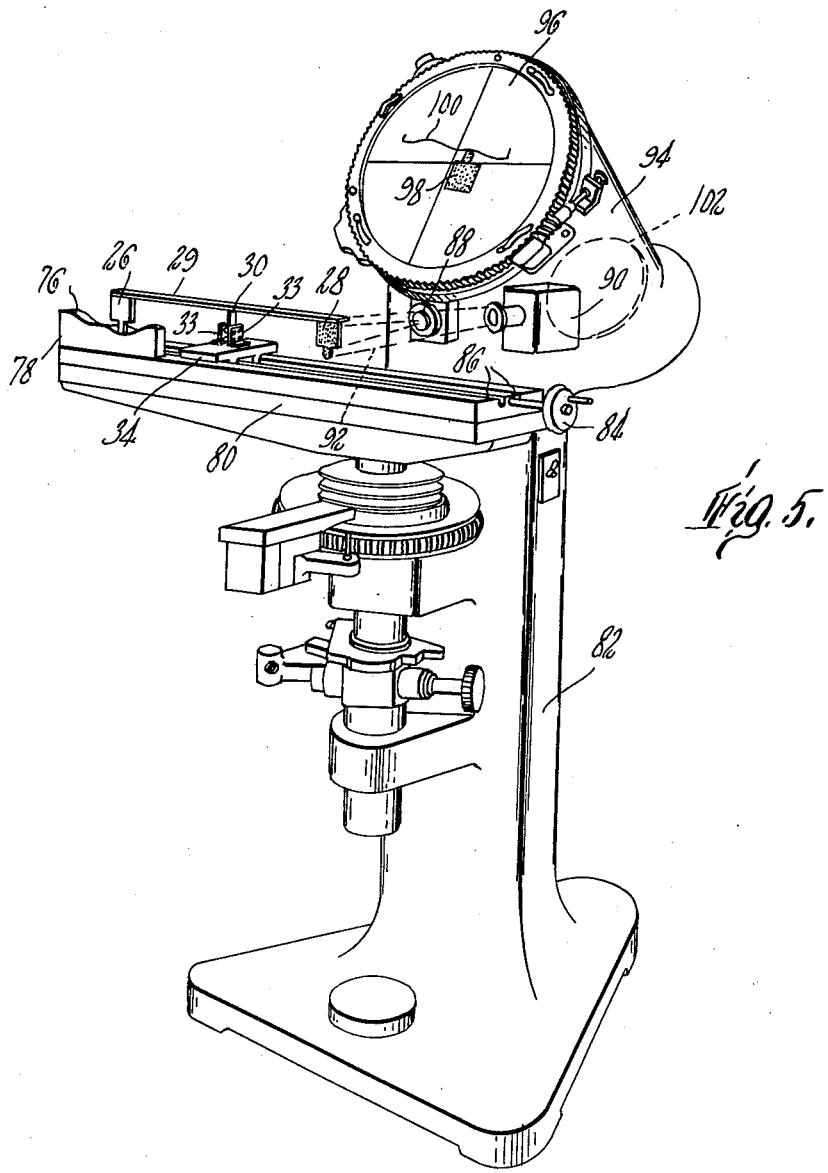
FIGURE 5 is a frontal view, in perspective, of a commercial form of optical comparator provided with an optical projection contour inspecting system embodying the invention.

Referring to FIGURE 1 of the drawing, optical projection inspection devices as presently used for contour measurement utilize a collimated beam of light 10 provided between a condensing lens 11 and a projection lens 12 in response to energization of the light source, such as a lamp 14, positioned on the opposite side of the condensing lens, as shown. This is known as a telecentric lens system and the image-producing rays pass through the principal focus, as shown by the dash lines of FIG. 1. A telecentric stop or small aperture may be placed at this principal focus to eliminate the non-image-forming rays. The size of the image produced is proportional to its distance from the principal focus, and the field of view of this lens is equal to its own area ($\pi r^2$). The cylindrical beam 10 provides a usable projection area or traceable area for the presentation of an object to be inspected or an area of movement for a stylus which is limited by the size or diameter D of the beam. The image of the object in the beam is projected through the lens 12 onto a mirror 15 as shown, and from the mirror may be applied to a conveniently positioned viewing screen 16. As in the usual optical comparator, a degree of magnification can be obtained with this arrangement, limited by the size of the viewing screen and the size of the lenses used. Economically, as hereinbefore indicated, a practical limit with present manufacturing methods and materials has been reached with lenses of the order of 6" in diameter. Thus the practical economic limit for the diameter D of the beam 10 will be of the order of 6", thus providing a limitation in the size of the usable projection area or traceable area in which an object may move while permitting reasonable enlargement on a viewing screen.

In accordance with the invention, therefore, the limitations imposed by such a system by way of size of light source, aperture of lens, and size of screen, have been obviated by departing from the use of the light cylinder and utilizing a wide angle viewing lens, with an illuminated stylus or movable light source at a predetermined distance from the center of the lens on one side and viewing screen means on the opposite side and positioned to receive light through the lens from the source or the stylus. The distances from the center of the lens are such as to provide a desired traceable area for movement of the light source or stylus and a desired viewing area for the image since the relative sizes of the traceable area and the viewing area are determined by their distances from the center of the lens. In other words, the lens system is entirely different and distinct from a telecentric lens system as the image-producing rays are gathered from a field of view larger than the diameter of the lens and converge to pass through the lens on the optical axis rather than through a principal focus located outside the lens. The image produced is proportional to its distance from the center of the lens rather than its distance from the principal focus. The field of view of this type lens is therefore an imaginary cone with its apex in the lens rather than a cylindrical column as in the telecentric objective lens of the type previously known and used in optical comparators.

The foregoing arrangement is shown in FIGURE 2 and may now be considered along with the system of FIGURE 1. In FIGURE 2 a wide angle camera type objective lens 18 is provided at a distance A from a traceable area 19 for movement of a stylus element or object 20 to be projected, and a distance B on the opposite side from a viewing screen area 21 in which the enlarged image 22 of the object may move. The object or stylus 20 is illuminated by a light source such as a lamp 24 arranged to illuminate the face of the object on the side toward the lens 18 or may be positioned in the traceable area itself as will hereinafter appear.

The magnification between the object 20 and the image 22 by this system is a function of the relative distances A and B of the stylus or object 20 and the screen or viewing area 21 from the center of the lens. Thus any desired magnification of the object may be provided without in any way affecting the choice of the screen size or viewing area since each is dependent upon its distance A or B from the center of the lens.

With this system it will be seen that the wide angle camera type lens 18 has a field of view far larger than its own diameter. An illuminated stylus or object 20 movable in the field at a distance A from the center of the lens will be limited only by choice of the distance A and its movement will be reproduced faithfully on a screen in the area 21 at almost any reasonable magnification depending upon the distance B.

Thus instead of a field of collimated light, the light source itself or an object illuminated by it is moved in the field of a wide angle lens, and a screen or viewing means is provided on the opposite side thereof at a predetermined distance, along the common axis 23 of the lens. This system is thus in no way limited by the size of the light source, the aperture of the lens, or the size of the screen, and its constructional cost is greatly reduced since a relatively small viewing lens of the wide angle type may be used at relatively low cost.

Such a system is highly adaptable to the problem of inspecting and measuring contours or contoured surfaces that cannot be projected directly on a screen and which must be reached by a probe or stylus element and reproduced by conjoint movement of a follower stylus affixed thereto.

It is further highly adapted to the solution of the problem of tracing larger and larger parts such as aircraft parts having long contoured surfaces, without involving high cost. A contour measuring or inspecting system embodying the invention and arranged to operate in accordance with the principles shown in FIGURE 2, is shown in FIGURES 3 and 4 to which attention is now directed.

In FIGURE 3, the optical projection contour measuring system comprises a hard tipped tracing element or stylus 26 rigidly connected in spaced relation to a follower or projection stylus 28, by a spacing and carrier bar 29, with both styli depending from the bar as shown. The bar is mounted on the upper end of a vertical rectangular stud 30 intermediate between the styli. The stud 30 is arranged to move vertically as indicated by the arrowed lines, in response to movement of the stylus 26, between sets of rollers 31 and 32 carried by a pair of brackets 33 mounted on a rolling carriage 34. The carriage is arranged to move in a lateral direction or horizontally in the present example, while the stud 30 moves vertically as the stylus tip 36 follows a contoured surface 38 of a work piece 39 to be inspected. Gravity acts to bias the stylus into engagement with the work. However, any suitable arrangement may be provided for biasing the stylus 26 to carry the tip 36 into firm but gentle engagement with the contour surface to be inspected and to permit movement of the stylus vertically as well as along the surface freely. The stylus is preferably carbide or sapphire tipped. With this arrangement it will be seen that the follower stylus 28 will conform to the movement of the tracing stylus 26 and the tip 40 of the latter stylus will trace a path as indicated by the dotted line 42 which conforms exactly in one-to-one ratio with the contour of the surface 38 to be inspected. The follower stylus may be made, in the present example, of any opaque material and is preferably of the same size and shape as the tracing stylus 26, at least in profile.

The elements are mounted on a table or other plane surface represented by the platen 44 on which is also mounted a suitable stand 46 holding a translucent screen 48 in a vertical position in the rear (as viewed in the drawing) of the follower or image stylus 28. The translucent screen, which may be of ground glass, is placed closely adjacent to the follower stylus 28 and is of an area sufficient to provide coverage for its movement in response to movement of the tracing stylus 26, whereby at all times it provides a silhouette image against the screen 48 in the field of a wide angle viewing lens 52. The screen 48 is illuminated from the opposite side by a suitable light source such as an electric lamp 50.

The light, with the image of the follower stylus 28, is then projected onto a receiving screen 54 of similar translucent material through the intermediary of the wide angle lens 52 effectively interposed between the stylus 28 and the screen 54 at distances along its axis to provide a desired magnification of the follower stylus 28 when projected upon the screen 54, as indicated by the projected image 56. The image is inverted and obverted and moves on the screen 54 with respect to a gage or indicia line 58 applied to a surface of the screen and representing the desired shape of the contoured surface 38 in magnified form. Thus as the tracing stylus tip 36 follows the contoured surface 38, the follower or stylus 28, moving in conformity therewith, in a one-to-one ratio both horizontally and vertically, is projected as an enlarged image 56 on the viewing screen 54 and the tip 60 thereof follows the indicia or gage line 58 exactly, if the contour surface 38 conforms with a predetermined standard.

With this arrangement it will be seen that the traceable area represented by the surface of the screen 48 may be made any desired size to permit the inspection of any desired length and height of a contoured surface. Likewise the viewing screen area, as provided by the screen 54, may be made any desired size for a desired magnification by choosing the relative spacing between the lens 52 and each of the screens as previously described in connection with FIGURE 2.

With this system, the size of the lens 52 may be relatively small, with a corresponding cost reduction over previously known systems for optical inspection and measurement of contoured surfaces and the like, and substantially without limitation as to range of stylus movement and size of image in any case. If desired, the arrangement of the follower or projection stylus may be such that the light source itself moves with the main stylus 26 as shown in FIGURE 4.

In FIGURE 4, the source of illumination or lamp 50 is placed in an opaque walled casing 66 which is mounted on the bar 29 in place of the stylus 28 and in the same position. The casing is provided with a forward end facing the lens 52 which is closed by a plate of translucent material 68, such as ground glass, on which is provided an opaque mask in the shape of the tracing stylus 26 to provide effectively a follower stylus 70 in conjunction with the light source which then moves with the tracing stylus 26 and is an opaque representation of it. This throws a spot of light on the screen 54 of the shape of the translucent screen 68 which effectively becomes the light source with shadow or masked portion therein in the shape of the follower stylus 70. With this arrangement the screen 48 of FIGURE 3 may be eliminated thus simplifying the equipment. The lamp 50 may be of the type which can be operated through a flexible supply lead or cord 72 in connection with the usual commercial electric current supply outlet indicated at 73, although any suitable high intensity light source may be provided which may operate as a follower stylus device.

The optical projection contour inspection system in accordance with the invention as described in connection with FIGURES 2 and 3 may be applied to a commercial optical comparator as shown in FIGURE 5, to which attention is directed along with FIGURE 3. Like reference characters for like parts are used in both figures.

Referring to FIGURE 5, tracing stylus 26 is connected through the rigid bar 29 with the follower stylus 28, and is guided in its movement along the contoured surface 76 of a work piece 78 to be inspected, on the movable carriage 34 which is arranged to move along the work table 80 of an optical comparator 82 of the pedestal type, in response to rotation of a hand wheel 84. The carriage 34 moves along and is guided by suitable ways 86 in the surface of the table. Vertical movement of the stylus 26 and of the follower stylus 28 is provided by the vertical support member 30 moving in the rollered brackets 33 which are mounted on the carriage 34 as in the construction shown in FIGURE 3.

The follower stylus 28 is positioned to move in the field of a wide angle lens 88 in the comparator and is illuminated by a high intensity lamp unit 90 mounted in a position to project a light beam 92 on the face of the follower stylus 28 adjacent to the lens 88. Through the mirror system of the comparator within the hood 94, light and the stylus image are directed onto the usual viewing screen 96 on the face of the comparator. The screen is of translucent material, such as ground glass, on which the enlarged image 98 of the follower stylus appears inverted and obverted as shown. This image moves with respect to an indicia or gage line 100 formed in the face of the screen as an enlarged master of the contour surface 76. The image 98 follows this line when the contour surface 76 is within predetermined limits or standard for that part.

In order to hold the specimen or part to be inspected, the work table 80 may be extended as indicated in the present example. As is well known, the internal optical system for the commercial type comparator shown includes a mirror element indicated by the dotted outline 102 and generally follows the arrangement shown in FIGURE 1 for the projection lens, mirror and viewing screen.

Because of the wide angle lens 88, the range of movement of the tracing and follower styli may be made sufficiently large to cover the length of almost any desired surface length to be inspected, and the magnification, as in the preceding embodiment, is determined by the distance of the viewing stylus 28 from the center of the lens 88 and the distance of the screen 98 from the center of the lens 88, in accordance with the principles described in connection with FIGURES 2 and 3.

In the system shown in FIGURE 5, the follower stylus 28 is brought into the field of the lens 88 by vertical movement of the table 80 to a known reference point and the carriage 34 is then moved by the hand wheel to cause the stylus 88 to trace the surface 76 to be inspected along its length while the follower stylus 28 traces a similar movement before the lens 88 to provide image movement on the screen 96 along the master inspection line 100.

Thus with an optical comparator arranged in accordance with the invention, a contoured surface may readily be inspected for conformance to a standard and duplicate pieces may rapidly be processed in this manner. Furthermore, in accordance with the invention, it will be seen that the screen 96 of the comparator may be made to any desired size or the image may be projected, as shown in the modification of FIGURE 3, on a screen or wall surface. In any case the system is in no way limited by the size of the light source, the aperture size of the lens, or the size of the screen, and the system may be constructed at low cost because of the simplified lens structure. Thus the tracing capacity or traceable area for the follower stylus and the viewing screen area are in no way limited and may be provided by selection of the relative spacing from the center of the lens for any desired arrangement of the relative sizes of the two areas, without regard to the diameter of a cylinder of light as in prior art devices.

While I have illustrated certain preferred embodiments of my invention, modifications within the spirit and scope of the appended claims may occur to persons skilled in the art.

What is claimed is:

1. An optical projection contour inspection system having a large tracing area, comprising in combination; a wide angle camera-type objective lens having a predetermined optical axis, said lens being the type wherein at least some of the rays from every portion of an object pass through the lens at a predetermined point in the lens on its optical axis and emerge to form an image which is proportional to its distance from this point in the lens, thereby providing a field of view defined by an imaginary cone with its apex at said point, a viewing screen positioned in spaced relation to said lens along said axis for receiving projected light through said lens, a tracing stylus element mounted for tracing movement on a work surface to be inspected, a follower stylus element corresponding to said tracing stylus element rigidly connected for conjoint movement with said tracing stylus element in a tracing area substantially larger than the area of said lens, the movement of said follower stylus being wholly within a field viewed by said lens and at a distance therefrom along said axis, and means for illuminating said follower stylus, said lens thereby projecting a real image of the outline of said follower stylus on said viewing screen in any of the positions of the follower stylus within said large traceable area.

2. An optical projection contour inspection system as defined in claim 1 further comprising indicia on said viewing screen for visual comparison with the path of movement of said image as a measure of conformity of a contour of said work surface with a standard represented by said indicia.

3. An optical projection contour inspection system as defined in claim 1 wherein said means for illuminating said follower stylus includes a source of light mounted on said follower stylus.

4. An optical projection contour inspection system as defined in claim 3 wherein said follower stylus includes an opaque casing having a translucent end wall, a lamp in said casing, and an opaque mask element on said translucent end wall having the configuration of the tracing stylus.

5. An optical comparator having a large tracing area for inspecting contoured surfaces of manufactured parts for conformity to a standard, said comparator comprising in combination; a viewing screen providing a predetermined viewing area of relatively large size, indicia on said viewing screen representative of the desired contour of a surface to be inspected, a tracing stylus mounted for tracing movement on a work surface to be inspected, a follower stylus providing an opaque representation of said tracing stylus rigidly connected therewith to follow the movement thereof in a predetermined plane, the movement of said opaque representation being in a relatively large traceable area, means including a light source for illuminating the movement of the follower stylus in said predetermined large traceable area, and a wide angle camera-type objective lens interposed between the viewing screen and said traceable area along an optical axis, said lens being the type wherein at least some of the rays from every portion of an object pass through the lens at a predetermined point in the lens on its optical axis and emerge to form an image which is proportional to its distance from this point in the lens, said lens thereby projecting an enlarged real image of the outline of said follower stylus on said screen, and said traceable area being wholly within a field viewed by said lens, which field is substantially larger than the diameter of the lens and is defined by a plane perpendicular to the axis of an imaginary right circular cone with its apex along said optical axis.

References Cited in the file of this patent

UNITED STATES PATENTS

| 1,934,582 | Bausch et al. | Nov. 7, 1933 |
| 2,203,389 | Kurtz | June 4, 1940 |
| 2,451,155 | DeBoer | Oct. 12, 1948 |
| 2,476,312 | Luety | July 19, 1949 |
| 2,542,755 | Dietrich | Feb. 20, 1951 |
| 2,580,239 | Murch | Dec. 25, 1951 |
| 2,718,813 | Leininger | Sept. 27, 1955 |

OTHER REFERENCES

"Concepts of Classical Optics" by John R. Strong, W. H. Freeman and Co., San Francisco, 1958, pages 348, 349.